(12) United States Patent
Kilian et al.

(10) Patent No.: US 6,564,442 B2
(45) Date of Patent: May 20, 2003

(54) WORKPIECE BENDING AND JOINING MACHINE

(75) Inventors: Friedrich Kilian, Flacht (DE); Hubert Wilbs, Schramberg (DE)

(73) Assignee: Trumpf GmbH + Co., Ditzingen (DE)

( * ) Notice: Subject to any disclaimer, the term of this patent is extended or adjusted under 35 U.S.C. 154(b) by 0 days.

(21) Appl. No.: 10/005,035

(22) Filed: Dec. 4, 2001

(65) Prior Publication Data
US 2002/0133926 A1 Sep. 26, 2002

(30) Foreign Application Priority Data
Dec. 4, 2000 (EP) .......................................... 00126627

(51) Int. Cl.⁷ ........................... B23P 23/00; B21D 11/22
(52) U.S. Cl. ............................ 29/560; 29/33 R; 72/461
(58) Field of Search ............................. 29/33 R, 33 S, 29/560, 26 A, 34 R; 72/461, 166; 219/56, 92, 121.63, 121.61

(56) References Cited

U.S. PATENT DOCUMENTS

| | | | | |
|---|---|---|---|---|
| 3,590,208 A | * | 6/1971 | Martini et al. | 219/92 |
| 3,641,303 A | * | 2/1972 | Collins | 219/56 |
| 5,301,410 A | * | 4/1994 | Finzer | 29/33 S |
| 5,341,665 A | * | 8/1994 | Christophel et al. | 72/166 |
| 5,532,450 A | * | 7/1996 | Iwai et al. | 219/121.63 |
| 5,897,796 A | * | 4/1999 | Forrest | 219/121.64 |
| 6,073,322 A | * | 6/2000 | Russo | 29/26 A |

FOREIGN PATENT DOCUMENTS

| | | | | |
|---|---|---|---|---|
| DE | 3909387 C1 | 3/1989 | | |
| EP | 0650 782 A1 | * 9/1994 | | 72/461 |
| JP | 401057986 A | * 3/1989 | | 29/560 |
| JP | 02274316 A | 11/1990 | | |

* cited by examiner

Primary Examiner—William Briggs

(57) ABSTRACT

A machine tool for processing sheet metal workpieces which has a bending station and a joining station between which the workpiece is moved. The bending station has a positioning stop for the positioning of the workpiece relative to the bending tools, and the stop is movable in controlled fashion by a motorized drive unit. This drive unit also moves a laser welding head at the joining station to perform a welding operation on the workpiece.

14 Claims, 5 Drawing Sheets

WORKPIECE BENDING AND JOINING MACHINE

BACKGROUND OF THE INVENTION

This invention relates to a machine for the processing of sheet metal workpieces and which incorporates a bending station for bending a workpiece and a joining station for welding adjacent surfaces of the bent workpiece.

A bending machine having a movable positioning system for the workpiece is described in European Patent A-0 650 782. Such a machine may include a programmable controller for controlling movement and actuation of the operational components.

In modern production operations, it is often necessary to process workpieces in different ways depending upon their type and design. For example, in today's flexible manufacturing environment, sheet metal products are first bent or folded and subsequently joined in an assembly operation. A machine capable of these two processing modes is described in Japanese Patent A-02274316. That machine incorporates a bending tool consisting of an upper bending tool and a lower bending die, as well as an integral, movable, motor-driven welding head. The welding head serves to produce weld joints on a workpiece clamped between the upper and lower bending dies of the machine.

It is an object of the present invention to provide a novel machine providing bending and welding operations in separate stations and enabling facile processing of the workpiece.

It is also an object to provide such a bending and welding machine which can be fabricated relatively economically and which is relatively simple and reliable in operation.

SUMMARY OF THE INVENTION

It has now been found that the foregoing and related objects may be readily attained in a sheet metal forming machine tool having a bending station including a bending tool and a cooperating bending die, the tool and die being relatively movable to bend a sheet metal workpiece disposed therebetween. This station also includes workpiece positioning means with at least one positioning stop for positioning the workpiece between the bending tool and die, first drive means for moving the positioning stop, and second drive means to effect relative movement of the bending tool and die to bend the workpiece to provide at least one pair of adjacent edge surfaces.

The machine tool also has a joining station which includes workpiece positioning means and at least one welding head for welding adjacent edge surfaces of the bent workpiece. The welding head is movable with the positioning stop along adjacent edge surfaces of the workpiece. Control means is provided for the second drive means to effect relative movement of the bending tool and die, for the first drive means for the positioning stop to effect movement of the welding head along the adjacent edge surfaces of the workpiece, and for the welding head to supply energy thereto to produce a weldment between the adjacent edge surfaces of the workpiece.

The bending tool is disposed above the bending die, and the bending tool is seated in an upper tool mount vertically movable relative to the bending die for bending the workpiece. The workpiece positioning means for holding the workpiece in a fixed position during the welding operation includes a workpiece holder which can be raised and lowered with the upper tool mount of the bending station whereby the workpiece can be positioned during welding.

Preferably, the tool mount of the bending station extends beyond the bending station to the joining station, and the movable workpiece holder of the joining station is coupled to the upper tool mount. The vertically movable workpiece holder of the joining station is exchangeably coupled to the upper tool mount, and the workpiece holder includes an angle section to clamp the workpiece in the area of the fold line.

Desirably, the bending die of the bending station is supported on a machine platen which extends beyond the bending station to the joining station, and the platen serves as a support for the workpiece and cooperates with the vertically movable workpiece holder to clamp the workpiece therebetween.

A robot may be included for the transport of the workpiece between the bending station to the joining station.

The first drive means for the positioning stop of the bending station is operative to move the welding head in a controlled manner relative to the workpiece during the execution of the welding operation.

In a preferred embodiment, the positioning stop is mounted on a backstop carrier movable in a controlled manner by the first drive means and the welding head can be moved in combination with the backstop carrier. Desirably, the welding head is detachably coupled to one of the positioning stop and the backstop carrier, and it may be adjustably positioned on the positioning stop or on the backstop carrier.

The welding head and power supply comprise a laser welding system which includes a laser beam generator and a flexible fiber optic cable between the generator and the welding head. It will be appreciated that machine tools designed in accordance with this invention obviate the need for complex engineering measures and control devices which would otherwise be necessary for precise positioning and movement of the joining system or of the die mount raising and lowering mechanism.

The upper die mount of the bending station is utilized for supporting the vertically movable workpiece holder of the joining station. The mounting system permits the easy exchange of the workpiece holder which is supported on the upper die mount in the case of wear and tear or damage or for adapting the overall system to different processing conditions. The machine platen performs a supporting function for both the bending and the joining stations.

The workpieces being processed can be transported from the bending station to the joining station, or vice versa. Although this can be done manually, preference is given to the use of at least one robot for performing this function. Moreover, in the majority of cases, practical considerations dictate that the joining operation follow the bending of the workpiece.

An enhanced implementation of the invention provides for coupling of the movement of the joining systems on the one hand and of the positioning backstops and/or backstop mounts on the other. In this case, the joining system may be directly supported on a positioning backstop or on a backstop mount. If appropriately configured, it is possible for a positioning backstop supporting a joining system to perform its intended function of aligning workpieces to be bent without any interference by the joining system. In this context it may be desirable to mount the joining system on the positioning backstop in a manner which permits movement relative to the latter. This makes it possible for the joining system, while not in use, to be moved along the positioning backstop into an out of the way position, i.e., away from the workpiece holder so as not to interfere with the workpiece alignment. Corresponding provisions can be made in such cases where a joining system is directly supported by a backstop mount.

The positioning backstop or the backstop mount of the bending station can be connected to or disconnected from the joining system in an on-demand fashion. For example, if the joining system is not needed for one or several processing cycles, it can be disconnected from the positioning backstop and/or backstop mount prior to the processing operation. Especially in cases where the joining system is not to be used for an extended period of time, it can be moved into the out of the way position before it is disconnected from the positioning backstop or backstop mount. Then, when needed again, the joining system can be retrieved from that parked position by the positioning backstop and/or backstop mount.

BRIEF DESCRIPTION OF THE DRAWINGS

The following description of an embodiment of the present invention explains this invention in more detail with reference to the illustrations in which.

DETAILED DESCRIPTION OF THE ILLUSTRATED EMBODIMENT

Figure 1:
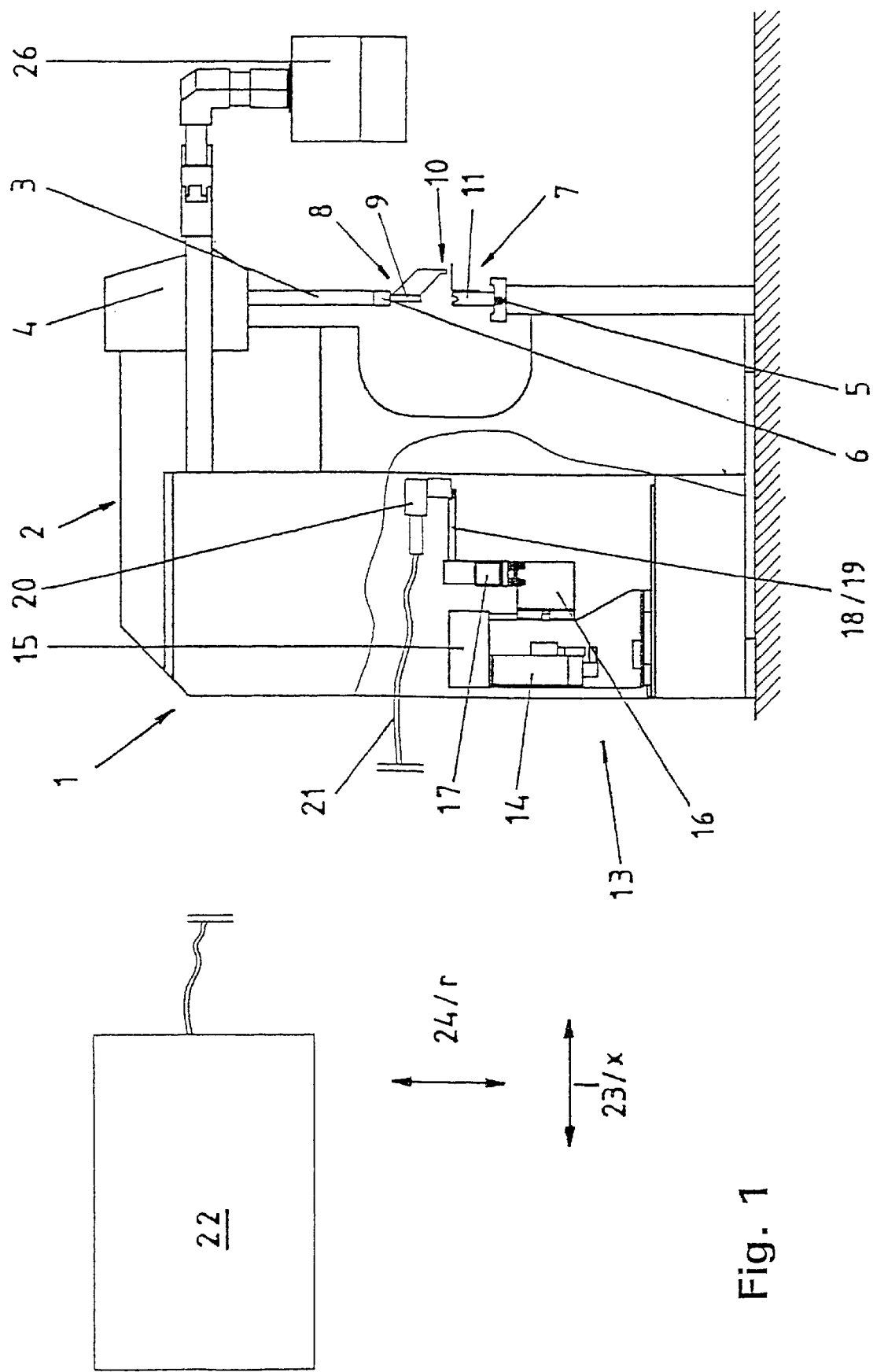
FIG. 1 is a highly simplified side elevational view of a machine tool for sheet metal processing which incorporates a bending station and a joining station.

As shown in FIG. 1, a machine tool 1 for sheet metal processing includes a rigid machine frame 2 in which the folding beam 3 can be raised and lowered along a guide (not shown). The folding beam 3 is moved by a conventional hydraulic folding beam drive 4 which is mounted on the machine frame 2.

Figure 2:
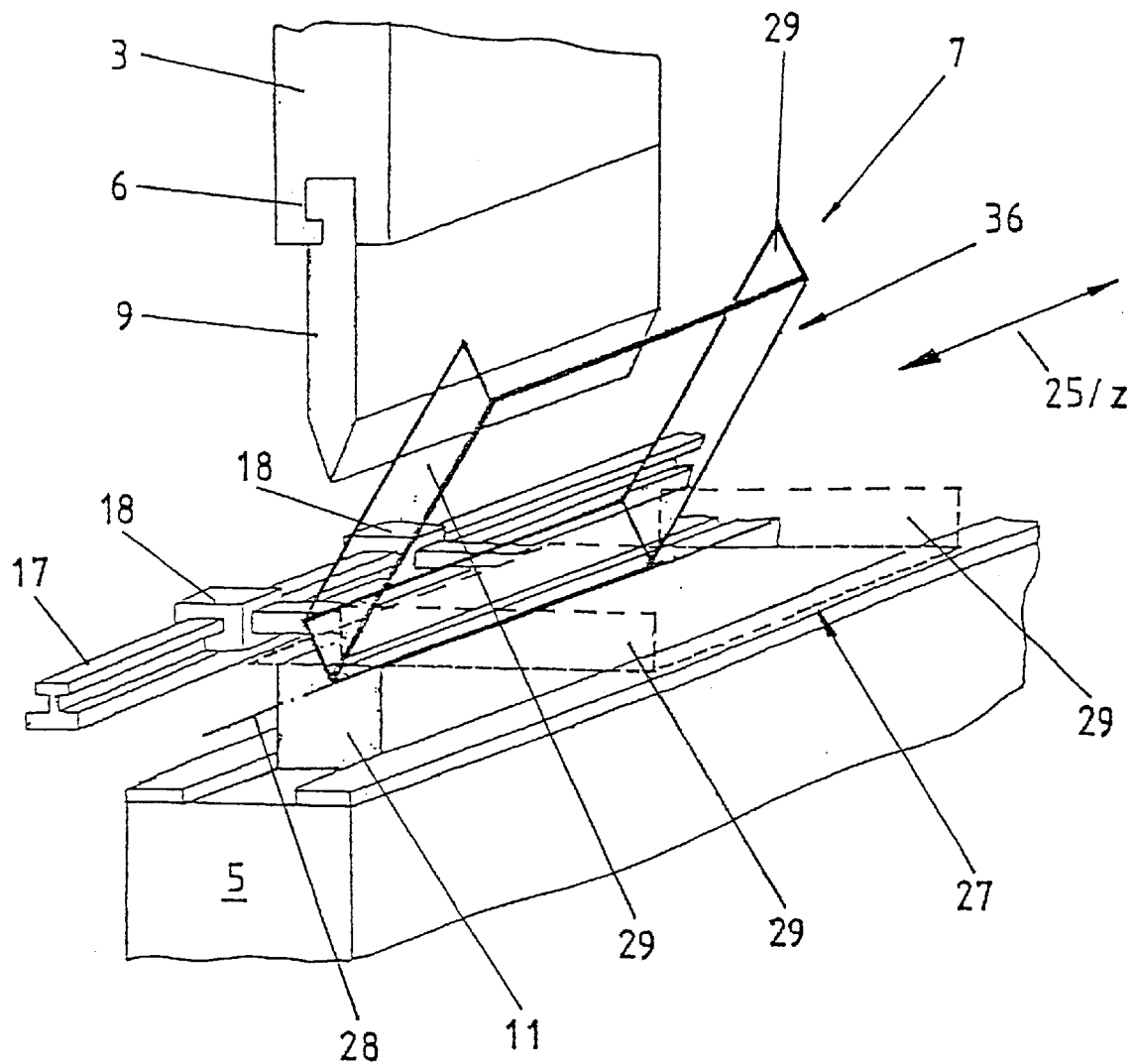
FIG. 2 is an enlarged perspective view of components of the bending station in the machine tool of FIG. 1 and showing a workpiece to be formed in dotted line and the formed workpiece in solid line.

As best seen in FIG. 2, opposite the folding beam 3 the machine frame 2 provides a machine platen 5. At its lower end facing the machine platen 5, the folding beam 3 includes a tool holder 6 providing a downwardly opening longitudinal channel extending perpendicularly to the plane of FIG. 1.

Also perpendicular to the plane of FIG. 1, are a bending station 7 and a joining station 8. The bending station 7 is located on the side adjacent the viewer in FIG. 1 and the joining station is on the opposite side.

Figure 3:
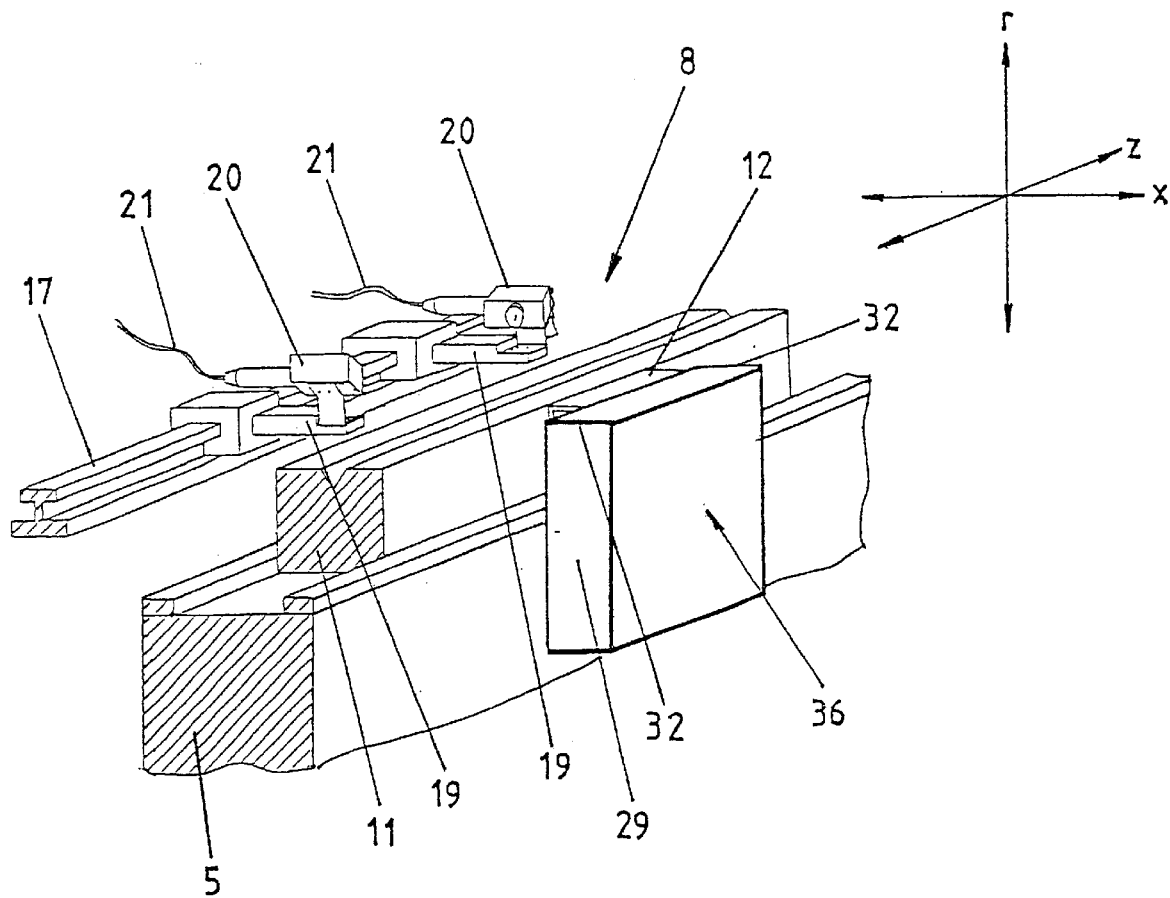
FIG. 3 is an enlarged perspective view of components in the joining station in the machine tool of FIGS. 1 and 2.
Figure 4:
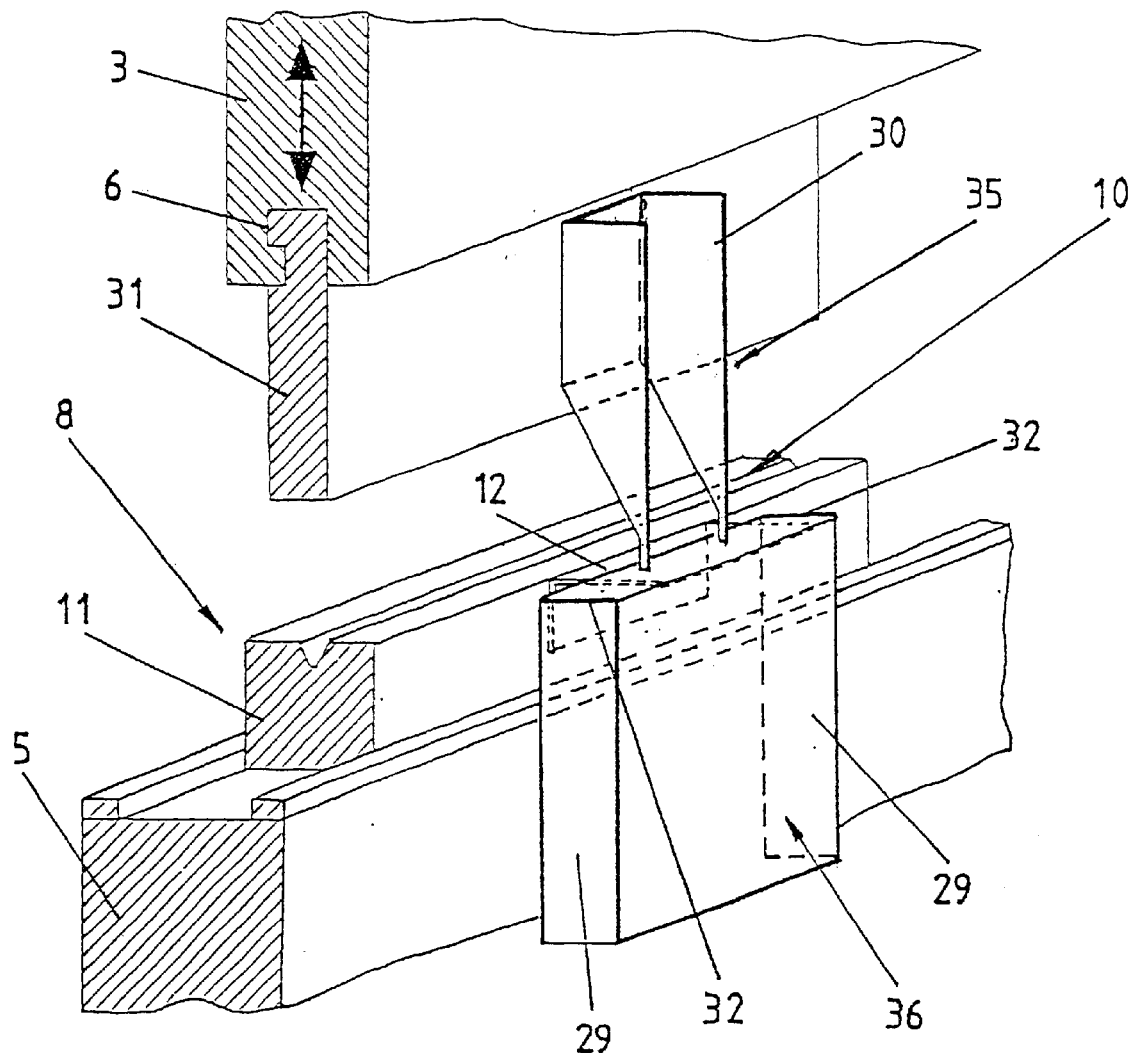
FIG. 4 is an enlarged perspective showing movable upper folding beam and workpiece holder.
Figure 5:
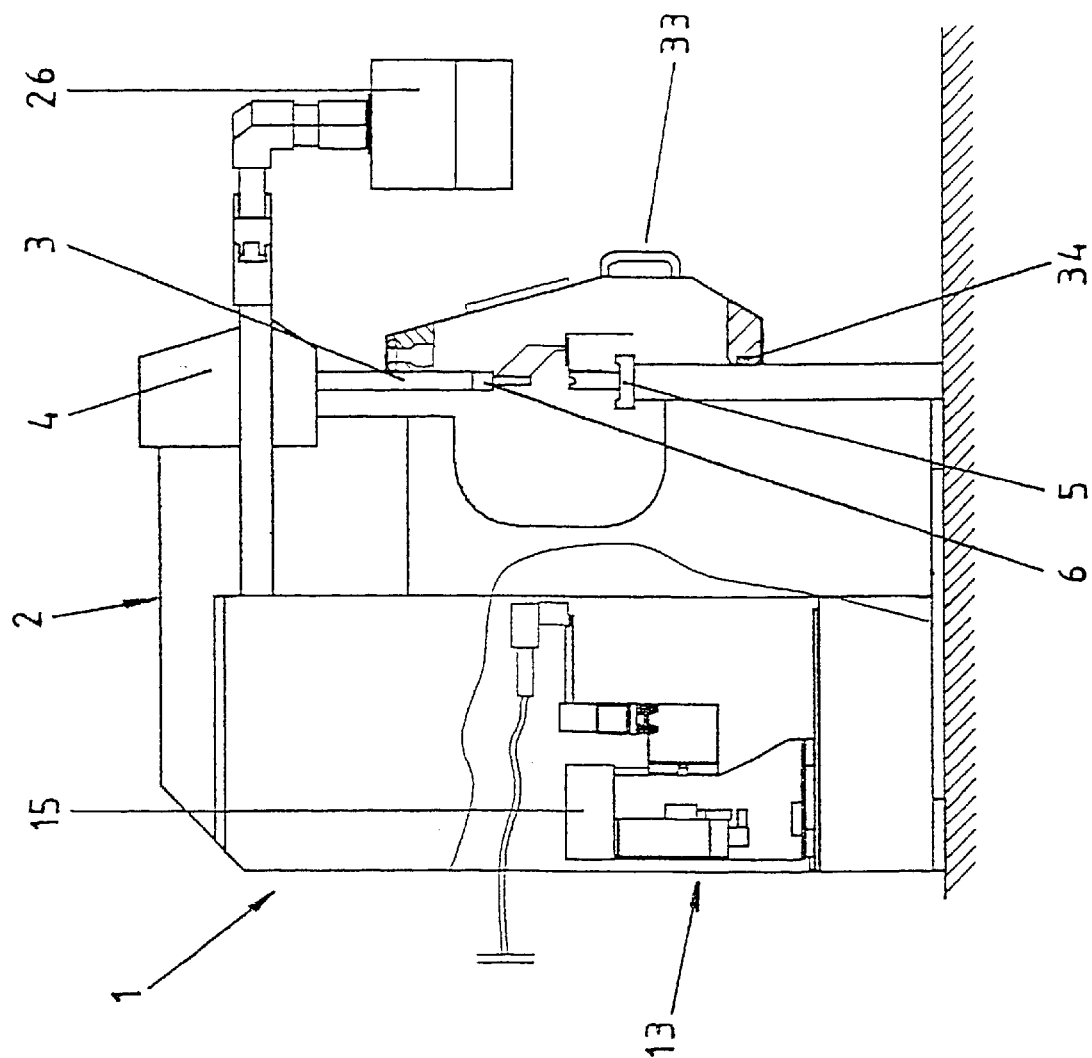
FIG. 5 is a side elevational view of the machine shown in FIG. 4 with a screen positioned to shield the joining station.

As seen in FIG. 3, within the bending station 7, the tool holder 6 on the folding beam 3 holds a bending tool or insert 9 serving as the upper bending die. Accordingly, the folding beam 2 serves as the upper bending die mount. As seen in FIGS. 4 and 5, within the joining station 8, fastened in the holder 6 of the folding beam 3 is the workpiece holder 35 of a workpiece mounting system.

The bottom die 11 is provided with a longitudinally extending V-shaped groove which extends over the entire length of the folding beam 3 perpendicularly to the plane in FIG. 1. In the bending station 7 this is the bottom bending die which, together with the bending tool insert 9, constitute the bending tool assembly in the bending station 7. Within the joining station 8 and attached to the bottom die 11 is a workpiece support 12 which cooperates with the workpiece holder 35 to constitute the workpiece mounting system 10.

A positioning system 13 in the form of a rear backstop is provided adjacent the rear of the machine 1 as viewed from the operator's position, spaced rearwardly of the folding beam 3 and the machine platen 5. It includes as its positioning drive a motorized drive unit 14 which is mounted on a movable fence stage 15. The fence stage 15 on its part guides a stop fence slide 16 which supports a stop mount in the form of a carrier rail 17. Mounted on the carrier rail 17 within the bending station 7 are two positioning stops 18. Within the joining station 8, the carrier rail 17 supports two mounting brackets 19 for a joining systems including two laser welding heads 20. Fiberoptic cables 21 connect the welding heads 20 to the laser generator 22. The positioning stops 18 and the brackets 19 are structurally matched in the example shown. As an alternative to the configuration illustrated, the positioning stops 18 and the mounting brackets 19 may be mounted on separate fence stages both driven by the drive unit 14.

By means of the drive unit 14, the fence stage 15 can be moved relative to the machine frame 2 in an x-direction as indicated in FIG. 1 by the double arrow 23. The drive unit 14 also serves to move the stop fence slide 16 on the fence stage 15 in the vertical redirection (as depicted by double arrow 24 in FIG. 1). Correspondingly, the drive unit 14 serves to move the carrier rail 17 mounted on the stop fence slide 16 as well as the positioning stops 18 and the mounting brackets 19 for the laser heads 20 in the plane defined in the x- and r-directions. In the example described, the carrier rail 17 is not independently movable in a vertical direction perpendicularly to the plane of projection of FIG. 1 (z-axis, depicted by the double arrow 25 in FIG. 2), but could be moved if it, i.e. the carrier rail 17, were to be mounted on the stop fence slide 16 in a way as to be movable in that direction. In the z-direction the positioning stops 18 of the bending station 7 and the support brackets 19 for the laser welding heads 20 of the joining station can be manually relocated on the carrier rail 17. In that connection, the positioning stops 18 and the support brackets 19 can be locked in their respective z-axis position on the carrier rail 17 by means of suitable locking devices (not shown).

All functional elements within the machine 1, especially the drive for the folding beam 4, the hydraulic drive unit 14, the laser welding heads 20, and the laser generator 22, are controlled by a programmable logic controller 26.

The processing, i.e., the forming of a metal sheet 27 in the machine tool 1, is described with reference to FIGS. 2–4.

The dotted outline in FIG. 2 indicates the sheet metal workpiece 27 in the configuration it was in when it was introduced into the bending station 7 of the machine 1. As shown, the metal sheet 27 has already been preprocessed to bend upwardly the flaps 29. Along one longitudinal side, the flaps 29 extend upwardly at a distance spaced inwardly from the flat edge portion of the sheet 27. That flat edge portion of the sheet 27 is to be bent, i.e., folded, in the bending station along a predefined bending line 28 and at a predefined bending angle.

To achieve that effect, as a first step, the drive unit 14 moves the positioning stops 18 into a position corresponding to the desired location of the bending line 28. This relocation of the positioning stops 18 takes place by the corresponding movement, controlled by the programmable logic controller 26, of the carrier rail 17 which supports the positioning stops 18. The operator then places the metal sheet 27 on the lower die 11 in the bending station 7 and pushes it against the positioning stops 18. Thereupon, by an appropriate movement of the folding beam 3, the bending tool 9 is moved downwardly to press the metal sheet 27 into the V-shaped slot of the lower die 11. The depth of penetration of the bending tool 9 into the lower die 11 is determined by the selected magnitude of the bending angle for the metal sheet 27 being bent and for which the value has been stored in the programmable logic controller 26.

When the bending tool 9 is moved upwardly, the operator can remove the metal sheet 27, folded as indicated by the solid lines in FIG. 2, from the bending station 7 of the machine tool 1. What was the flat edge of the metal sheet 27 is now bent upwardly into a position where its front face touches the upstanding edges flaps 29. The metal sheet 27 has taken on the shape of a metal hood 36, indicated in FIG. 2 by the solid outline, but for better visualization of the component as a transparent object.

Next, the operator transports the metal hood 36 to the joining station 8 of the machine 1. Alternatively, this step can be performed by a robot(not shown) on the side of the machine normally occupied by the operator. In the joining station 8, the laser welding heads 20 are mounted on the carrier rail 17 by the support brackets 19. The position of the laser welding heads 20, predefined in the x- r- and z-directions, is as shown in FIG. 3. For clarity, the illustration in FIG. 3 omits the folding beam 3 with its associated workpiece holder 35.

The metal hood 36, aligned as shown in FIG. 3, is placed in the joining station 8 of the machine tool 1. The forward edge of the metal sheet 27, previously bent upwardly in the bending station 7, rests on the workpiece support 12 attached to the lower die 11. The lateral flaps 29 extend in a vertical direction. The front end of the workpiece support 12 facing the operator constitutes a positioning stop, whereby the workpiece support 12 serves as a positioning device for the metal hood 36.

After the metal hood 36 has been placed in its correct position on the workpiece support 12, the programmable logic controller 26 causes the previously raised folding beam 3, with the workpiece holder 35 attached to it, to be lowered. The workpiece holder 35 includes a sheet metal angle section 30 as well as a base plate 31 to which the angle section 30 is bolted. Along the base plate 31 the workpiece holder 35, with a suitably contoured plate edge, is interchangeably inserted in the tool holder 6 on the folding beam 3. The workpiece holder 35 is moved into its lower position to press against the metal hood 36 which is firmly clamped on the workpiece support 12. At this point the legs of the angle section 30 of the workpiece holder 35 seat between the inner corners 32 of the flaps 29 and the previously bent-up edge portion of the metal sheet 27, the overall configuration being as shown in FIG. 4. For the sake of clarity, the laser welding heads 20 mounted in the joining station 8 have been omitted in the drawing.

Once the metal hood 36 has been firmly secured by means of the workpiece mounting system 10, the programmable logic controller 26 operates the drive unit 14 to move the carrier rail 17 and with it the laser welding heads 20 in the x-direction along the outside of the corners 32. As soon as the laser welding heads 20 move in the x-direction from their initial position shown in FIG. 3 and reach the ends of the corners 32 facing them, they are switched on by the controller 26. The laser welding heads 20 remain active until they have reached the other or operator side of the corners 32. At that point the controller 26 deactivates the laser welding heads 20. In their movement along the metal hood 36, the laser welding heads 20 produce a weldment between the flaps 29 and the previously bent up edge portion of the metal sheet 27. The side walls of the metal hood 36 are thus joined by these weldments.

In the illustrated operation, the laser welding heads 20 have already been aligned in their correct position in the z- and r-directions by an appropriate adjustment of the positioning stops 18 in the bending station, and require for the welding step, the movement described above in the x-direction only. In other processing applications, it is entirely possible for the laser welding heads 20, upon completion of the folding operation in the bending station 7 and prior to their activation, to be adjusted in the r- and/or z-direction as well. In the r-direction it is the drive unit 14 that moves the laser welding heads 20 while in the z-direction the laser welding heads 20 in this particular machine 1 are adjusted manually. As an alternative, a motorized drive may be included for moving the carrier rail 17 and/or the mounting brackets 19 or the laser welding heads 20 themselves into their correct position in the z-direction under the control of the programmable logic controller 26.

Upon completion of the weldments at the corners 32, an appropriate movement of the carrier rail 17 in the x-direction returns the laser welding heads 20 to their initial position illustrated in FIG. 3. Thereupon, the folding beam 3 with its associated workpiece holder 35 is lifted and the operator can remove the finished metal hood 36 from the joining station 8 of the machine 1.

During the operation of the laser welding heads 20, a welding shield 33, shown in FIG. 5, is provided and moved in front of the joining station 8 on the operator side. As can be seen in FIG. 5, the welding shield 33 can be moved on a guide track 34 on the machine frame 2.

Thus, it can be seen from the foregoing detailed description and attached drawings that the machine tool of the present invention may be fabricated readily from sturdy components to provide simple and reliable operation.

Having thus described the invention, what is claimed is:
1. A sheet metal forming machine having:
 (a) a bending station including
  (i) a bending tool and cooperating bending die, said tool and die being relatively movable to bend a sheet metal workpiece disposed therebetween;
  (ii) workpiece positioning means including at least one positioning stop for positioning the workpiece between said bending tool and die;
  (iii) first drive means for moving said positioning stop;
  (iv) second drive means to effect relative movement of the bending tool and die to bend the workpiece to provide at least one pair of adjacent edge surfaces;
 (b) a forming station including
  (i) at least one welding head for welding adjacent edge surfaces of the bent workpiece, said welding head being movable with said positioning stop;
  (ii) workpiece positioning means; and
 (c) control means
  (i) for said second drive means to effect relative movement of said bending tool and die
  (ii) for said first drive means for said positioning stop to effect movement of said welding head along the adjacent edge surfaces of the workpiece, and

(iii) for said welding head to supply energy thereto to produce a weldment between the adjacent edge surfaces of the workpiece.

2. A sheet metal forming machine in accordance with claim 1 wherein said bending tool is disposed above said bending die and seated in an upper tool mount vertically movable relative to said bending die for bending the workpiece, and wherein said workpiece positioning means in said welding station during the welding operation includes a workpiece holder which can be raised and lowered with the upper tool mount of the bending station whereby the workpiece can be positioned by said backstop during welding.

3. A sheet metal forming machine in accordance with claim 2 wherein said tool mount of the bending station extends beyond the bending station to the joining station, and wherein said movable workpiece holder of said joining station is coupled to said upper tool mount.

4. A sheet metal forming machine in accordance with claim 2 wherein said vertically movable workpiece holder of said joining station is exchangeably coupled to said upper tool mount.

5. A sheet metal forming machine in accordance with claim 2 wherein said workpiece holder includes an angle section to clamp the workpiece in the area of the fold line.

6. A sheet metal forming machine in accordance with claim 2 wherein said bending die of said bending station is supported on a machine platen which extends beyond the bending station to the joining station, said platen serving as a support for the workpiece and cooperates with said vertically movable workpiece holder to clamp the workpiece.

7. A sheet metal forming machine in accordance with claim 2 wherein there is included a robot for the transport of the workpiece between said bending station and said joining station.

8. A sheet metal forming machine in accordance with claim 1 wherein said first drive means for said positioning stop of said bending station is operative to move said welding head in a controlled manner relative to the workpiece during the execution of the welding operation.

9. A sheet metal forming machine in accordance with claim 1 wherein said welding head can be moved with said positioning stop.

10. A sheet metal forming machine in accordance with claim 1 wherein said positioning stop is mounted on a backstop carrier movable in a controlled manner by said first drive means and wherein said welding head can be moved in concert with the backstop carrier.

11. A sheet metal forming machine in accordance with claim 10 wherein said welding head is detachably coupled to one of said positioning stop and said backstop carrier.

12. A sheet metal forming machine in accordance with claim 1 wherein said welding head may be adjustably positioned on said positioning stop and on said backstop carrier.

13. A sheet metal forming machine in accordance with claim 1 wherein said welding head and power supply comprise a laser welding system.

14. A sheet metal forming machine in accordance with claim 13 wherein said laser welding system includes a laser beam generator and a flexible fiber optic cable between said generator and said welding head.

* * * * *